(12) United States Patent
Klare et al.

(10) Patent No.: US 7,534,471 B2
(45) Date of Patent: May 19, 2009

(54) TREATMENT OF POROUS ARTICLE

(75) Inventors: Robert John Klare, St. Joseph, MO (US); Greg Strugalski, Lee's Summit, MO (US)

(73) Assignee: BHA Group, Inc., Kansas City, MO (US)

( * ) Notice: Subject to any disclaimer, the term of this patent is extended or adjusted under 35 U.S.C. 154(b) by 27 days.

(21) Appl. No.: 11/048,228

(22) Filed: Feb. 1, 2005

(65) Prior Publication Data
US 2005/0129851 A1    Jun. 16, 2005

Related U.S. Application Data

(62) Division of application No. 10/255,043, filed on Sep. 20, 2002.

(51) Int. Cl.
*B05D 3/10*    (2006.01)
*B32B 3/26*    (2006.01)

(52) U.S. Cl. .................. 427/307; 427/336; 427/337; 428/304.4; 428/315.5; 428/320.2

(58) Field of Classification Search .............. 427/307, 427/336, 337, 393.4
See application file for complete search history.

(56) References Cited

U.S. PATENT DOCUMENTS 4,803,078 A * 2/1989 Sakai .................. 424/445
6,030,663 A * 2/2000 McClain et al. .......... 427/389.9
6,228,477 B1 * 5/2001 Klare et al. .............. 428/315.5
6,960,633 B2 * 11/2005 Wynne et al. .............. 525/383

FOREIGN PATENT DOCUMENTS

JP    07-144121    6/1995

* cited by examiner

*Primary Examiner*—Timothy H Meeks
*Assistant Examiner*—Cachet I Sellman
(74) *Attorney, Agent, or Firm*—Greg Strugalski; Lana Knedlik; Frank A. Landgraff

(57) ABSTRACT

The present invention is a method for modifying at least one property of a porous membrane. The method comprises the steps of providing a porous membrane. The method also includes exposing the membrane to a fluid at supercritical conditions. At least one property of the membrane is modified while the membrane is exposed to the fluid at supercritical conditions. The condition of the fluid is changed in such a manner that the porous membrane retains the modified property. The present invention is also sheet material that is water-resistant, moisture vapor transmissive and air permeable. The sheet material comprises a membrane having an open pore structure including surfaces defining a plurality of interconnecting pores extending through the membrane and between major sides of said membrane in which the pores have an average pore size. The membrane is made from a material tending to absorb oils and contaminating agents. A uniform coating of precipitated fluorinated urethane polymer material on at least portions of the surfaces of the nodes and fibrils defining the pores. The precipitated fluorinated urethane polymer material provides oil and contaminating agent resistance of at least a number 6 by AATCC 118 testing and an air permeability of at least 0.20 CFM per square foot by ASTM D737 testing.

28 Claims, 5 Drawing Sheets

TREATMENT OF POROUS ARTICLE

CROSS-REFERENCE TO RELATED APPLICATIONS

This application is a Divisional of U.S. patent application Ser. No. 10/255,043, filed on Sep. 20, 2002, which is hereby incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention relates generally to treating a porous article and to the resulting treated article. In particular, the present invention relates to treating a porous membrane to modify one or more property or characteristic of the membrane and to the membrane with the modified property or characteristic.

2. Description of Related Art

It is known that a porous membrane may have at least one property that is limited by the material that the membrane is made from. For example, a porous membrane made from an expanded polytetrafluoroethylene (ePTFE) material that is intended for use in garments and apparel has excellent hydrophobicity so it is considered to be waterproof at relatively low challenge pressure. However, the ePTFE membrane tends to absorb oil. Such a tendency to absorb oil could affect the hydrophobicity in the area of the membrane that has absorbed the oil so that area of the membrane may no longer be considered waterproof.

U.S. Pat. No. 4,194,041 discloses a way to protect an ePTFE membrane from contamination by oil. A continuous hydrophilic film is attached to the ePTFE membrane to protect one side of the ePTFE membrane from oil. This structure is not air permeable and the hydrophilic film must contain moisture to transmit the moisture through the membrane. A heavier garment results from the necessary moisture present in the hydrophilic film. A person wearing a garment incorporating the membrane with the hydrophilic film often can feel uncomfortable because the hydrophilic film that contains moisture contacts the wearer's body, especially in cool environments. Such discomfort has been described as a "wet and clammy" feeling. This discomfort may be further aggravated by a lack of air moving through the garment that could serve to carry the moisture away from inside the garment.

U.S. Pat. No. 5,539,072 discloses the use of relatively small fluorinated acrylate particles to form a protective coating on a membrane. U.S. Pat. No. 5,976,380 discloses using a solution to provide a hydrophilic coating on a porous membrane. U.S. Pat. No. 5,156,780 discloses the in-situ polymerization of a protective coating layer on membrane.

U.S. Pat. Nos. 6,228,447 and 6,410,084 disclose an improved membrane structure that is air permeable to overcome the discomfort drawback described above yet protect the ePTFE membrane from oil contamination. A fluorinated acrylate oleophobic treatment is applied from relatively large particles in an aqueous dispersion in a manner so pores in the ePTFE membrane are not completely blocked. Air flow is permitted through the ePTFE membrane while it is protected from oil contamination. The effectiveness of the treatment is dependent on the particle size of the treatment material relative to the effective pore size in the ePTFE membrane.

Alternative and improved treatment methods and treatment materials are sought to minimize this dependency on the treatment material particle size relative to the pore size to be treated. It is also desired that modified properties or characteristics of the membrane be provided in some cases other than oleophobicity. These properties may include sintering, hydrophilicity, electrical conductivity, ion conductivity, porosity, optical reflectivity and color.

BRIEF SUMMARY OF THE INVENTION

The present invention is directed to a method for modifying at least one property of a porous membrane. The method comprises the steps of providing a porous membrane and exposing the membrane to a fluid at supercritical conditions. At least one property of the membrane is modified while the membrane is exposed to the fluid at supercritical conditions. The condition of the fluid is changed in such a manner that the porous membrane retains the modified property.

The method further includes the steps of providing a treatment material that is soluble in the fluid at the supercritical conditions. The porous membrane is exposed to the treatment material dissolved in the supercritical fluid for a predetermined amount of time and at a predetermined temperature and pressure. The treatment material precipitates onto surfaces of the porous membrane to effect the modification of the property of the porous membrane when the fluid condition changes to a state in which the treatment material is no longer soluble.

The method includes the step of providing a fluid that has a surface tension less than 5.0 dynes/cm. The method also includes the step of providing carbon dioxide ($CO_2$) as the fluid. The providing carbon dioxide as the fluid step may further include the step of providing a co-solvent to aid in solubilizing the treatment material in the fluid. The property of the membrane that is modified is selected from the group comprising the amount of amorphous content, porosity, oleophobicity, hydrophilicity, electrical conductivity, optical reflectivity, ion conductivity and color.

The method also includes providing an open pore membrane. The providing an open pore membrane step includes providing an expanded polytetrafluoroethylene (ePTFE) membrane. Fluid flows through more than one layer of porous membrane in a plurality of layers wrapped on a perforated core.

The method may include the step of exposing the PTFE material of the ePTFE membrane to carbon dioxide ($CO_2$) at supercritical conditions to swell a portion of the PTFE material from an initial size to a swelled size. Crystalline bonds in the swelled portion of the PTFE material break to render the swelled portion more amorphous. Exposure of the carbon dioxide ($CO_2$) at supercritical conditions to the PTFE material is removed so the portion of the PTFE material returns towards the initial size while retaining the more amorphous condition in that portion of the PTFE material.

The method may also include the step of retaining a portion of the treatment material in a portion of the ePTFE membrane by moving a portion of the treatment material dissolved in supercritical carbon dioxide into a swelled portion of the PTFE material. The PTFE material is permitted to return towards its original size and configuration to absorb the portion of the treatment material within the PTFE material as the exposure to supercritical carbon dioxide is removed. The absorbed portion of the treatment material may exude from the PTFE material.

The present invention is also directed to the membrane made according to the method of the present invention that is waterproof, moisture vapor transmissive and air permeable. The membrane has a structure defining a plurality of pores extending through and between the major sides of the sheet material. A substantially uniform fluorinated urethane polymer coating is deposited on surfaces of the membrane without completely blocking the pores in the membrane. The coating modifies at least one property of the membrane, such as oleophobicity.

The coating is applied in a low surface tension solution capable of entering the pores in the membrane. The coating is deposited on surfaces of the nodes and fibrils upon rendering the coating insoluble in the solvent. The solvent is carbon dioxide in a supercritical state.

The precipitated fluorinated urethane polymer material provides oil resistance of at least a number 6 per AATCC 118 testing while permitting an air permeability of at least 0.20 CFM per square foot by ASTM D737 testing. At least a portion of the fluorinated urethane polymer is absorbed by amorphous portions of the membrane. At least a portion of the absorbed fluorinated urethane polymer exudes from the membrane.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

Further features of the present invention will become apparent to those skilled in the art to which the present invention relates from reading the following description with reference to the accompanying drawings, in which.

DETAILED DESCRIPTION OF PREFERRED EMBODIMENT

Figure 1:
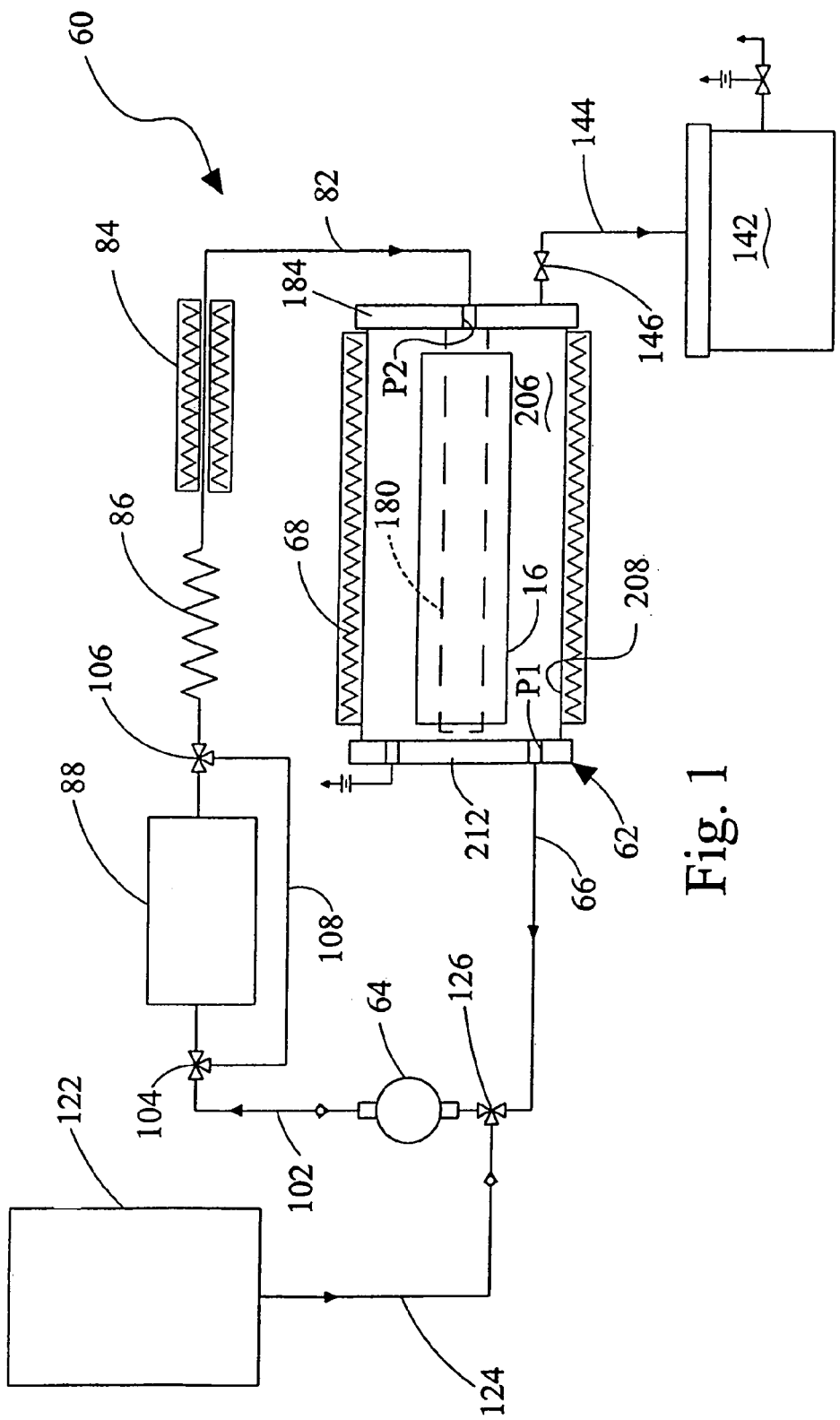
FIG. 1 is a schematic view of the process and equipment used to treat a membrane according to the present invention.

The present invention includes a method of treating a porous membrane to change or modify one or more of its properties or characteristics. The present invention also includes the resultant treated membrane having at least one modified property. The porous membrane may be any suitable porous membrane and is preferably microporous. The membrane may be made from any suitable material, such as expanded polytetrafluoroethylene (ePTFE). The treatment may be any suitable treatment that would change or modify at least one property or characteristic of the porous membrane, such as, without limitation, color, oleophobicity, hydrophilicity, electrical conductivity, optical reflectivity, ion conductivity, porosity or amount of crystallinity.

There are numerous uses for a porous membrane that has a property or characteristic changed or modified. By way of example, a laminated fabric incorporating a treated or modified composite membrane 12 (FIG. 3), made according to the present invention, may be used in garments or apparel. The composite membrane 12 is wind resistant, waterproof, moisture vapor transmissive and air permeable. The composite membrane 12 has oleophobicity as the property modified by the treatment method to offer protection from contaminating agents, such as oil-containing body fluids in the form of perspiration.

"Moisture vapor transmissive" is used to describe the passage of water vapor through a structure, such as the composite membrane 12. The term "waterproof" is used to describe that the composite membrane 12 does not "wet" or "wet out" by a challenge liquid, such as water, and prevents the penetration of a challenge liquid through the membrane. The term "wind resistant" is used to describe the ability of the composite membrane 12 to prevent air penetration above more than about three (3) cubic feet per minute (CFM) per square foot at a differential pressure drop 0.5 inches of water but has some air permeability to provide enhanced comfort to someone wearing the laminated fabric. "Air permeable" is used to describe the ability of the composite membrane 12 to permit a relatively small amount, for example less than about three (3) CFM per square foot, of air to pass through it. The term "oleophobic" is used to describe a material that is resistant to contamination from absorbing oils, greases, soap, detergent or body fluids, such as perspiration.

The composite membrane 12 made according to the present invention includes an untreated or unmodified membrane 16. The untreated or unmodified membrane 16 is porous, and preferably microporous, with a three-dimensional matrix or lattice type structure of numerous nodes 22 interconnected by numerous fibrils 24. The material that the membrane 16 is made from may be any suitable material but is preferably made of expanded polytetrafluoroethylene (ePTFE) that has preferably been at least partially sintered. Generally, the size of a fibril 24 that has been at least partially sintered is in the range of about 0.05 micron to about 0.5 micron in diameter taken in a direction normal to the longitudinal extent of the fibril.

Surfaces of the nodes 22 and fibrils 24 define numerous interconnecting pores 26 that extend completely through the membrane 16 between opposite major side surfaces of the membrane in a tortuous path. Preferably, the average size S of the pores 26 in the unmodified membrane 16 is sufficient to be deemed microporous, but any pore size may be used in the present invention. A suitable average size S for the pores 26 in the unmodified membrane 16 may be in the range of 0.01 to 10 microns, and preferably in the range of 0.1 to 5.0 microns. It is known that a porous ePTFE membrane, while having excellent hydrophobic properties, is oleophilic. That is, the material making up the unmodified membrane 16 is susceptible to contamination by absorbing oil. Once this occurs the contaminated regions of the unmodified membrane 16 are considered as "fouled" because the pores 26 can be easily wet by a challenge liquid, such as water, and the membrane is no longer considered waterproof.

Liquid penetration resistance of the fouled unmodified membrane 16 may be lost if a challenge fluid or liquid can "wet" the membrane. The unmodified membrane 16 is normally hydrophobic but loses its liquid penetration resistance when the challenge liquid initially contacts and wets a major side of the membrane and subsequently contacts and wets the surfaces defining the pores 26 in the membrane. Progressive wetting of the surfaces defining the interconnecting pores 26 occurs until the opposite major side of the porous membrane 16 is reached by the wetting or challenge liquid. If the challenge liquid cannot wet the porous membrane 16, liquid penetration resistance is retained.

The membrane 16 is preferably made by extruding a mixture of polytetrafluoroethylene (PTFE) fine powder particles (available from DuPont under the name TEFLON® fine powder resin) and lubricant. The extrudate is then calendared. The calendared extrudate is then "expanded" or stretched in at least one and preferably two directions to form the fibrils 24 connecting the nodes 22 in a three-dimensional matrix or lattice type of structure. "Expanded" is intended to mean sufficiently stretched beyond the elastic limit of the material to introduce permanent set or elongation to the fibrils 24. The membrane 16 is preferably then heated or "sintered" to reduce and minimize residual stress in the membrane material. However, the membrane 16 may be unsintered or partially sintered as is appropriate for the contemplated use of the membrane.

Other materials and methods can be used to form a suitable membrane 16 that has an open pore structure. For example, other suitable materials that may be used to form a porous membrane include polyolefin, polyamide, polyester, polysulfone, polyether, acrylic and methacrylic polymers, polystyrene, polyurethane, polypropylene, polyethylene, cellulosic polymer and combinations thereof. Other suitable methods of making a porous membrane include foaming, skiving or casting any of the suitable materials.

The ePTFE membrane 16 contains many small interconnected capillary-like pores 26 (FIG. 3) that fluidly communicate with environments adjacent to the opposite major sides of the membrane. Therefore, the propensity of the ePTFE material of the membrane 16 to adsorb a challenge liquid, as well as whether or not a challenge liquid would be adsorbed into the pores 26, is a function of the surface energy of the challenged material, the surface tension of the liquid, the relative contact angle between the liquid and challenged material and the size or effective flow area of the capillary-like pores.

One way to prevent entry of the challenge liquid into the pores 26 is to make the pores extremely small. However, this may be undesirable or impractical. Another way to prevent or minimize the loss of resistance to liquid penetration of an ePTFE membrane is to have the surface energy of surfaces of the membrane be lower than the surface tension of the challenge liquid and the relative contact angle more than 90°. Surface energy and surface tension values are typically given in units of dynes/cm. Examples of surface energies, relative surface tensions and some measured relative contact angles are listed in the table below:

| Material | Surface Energy | Surface Tension | Contact Angle |
|---|---|---|---|
| PTFE | 18-19 dynes/cm | | |
| deionized water | | 72 dynes/cm | 110°-112° |
| tap water | | varies with source | 114°-118° |
| blood | | 60 dynes/cm | 88° |
| perspiration | | 42 dynes/cm | |
| laundry detergent mix | | 30.9 dynes/cm | 112° |
| MIBK | | 23.6 dynes/cm | 42° |
| acetone | | 23.5 dynes/cm | 37° |
| 100% IPA | | 20.9 dynes/cm | 62° |

-continued

| Material | Surface Energy | Surface Tension | Contact Angle |
|---|---|---|---|
| hexane | | 17.9 dynes/cm | 52° |
| DEET | | 14.8 dynes/cm | |
| liquid $CO_2$ (20° C., 58 | | 1.5 dynes/cm | |
| supercritical $CO_2$ | | ≈0.0 dynes/cm | |

In the course of experimentation it was found that a porous membrane 16 could be coated or treated with a modifier, such as a fluorinated polymer material in such a way that enhanced oleophobic property results without compromising the air permeability of the membrane. The composite membrane 12 includes a treatment or coating 28 (FIG. 4) on surfaces of the membrane 16. Most significantly the coating 28 adheres and conforms to the surfaces of the nodes 22 and fibrils 24 that define the pores 26 in the membrane 16. The coating 28, thus, improves or modifies the oleophobicity of the material of the membrane 16 to resist contamination from absorbing of contaminating materials such as oils, body oils in perspiration, fatty substances, soap, detergent-like surfactants and other contaminating agents. The composite membrane 12 embodying the present invention remains durably liquid penetration resistant when subjected to rubbing, touching, folding, flexing, abrasive contact or laundering.

The coating 28 adds a relatively low surface energy layer to an ePTFE membrane so a relative contact angle of most challenge liquids, oils and contaminating agents is greater than 90° so they cannot foul the composite membrane 12. There are several such oleophobic polymeric coatings that appear to be suitable. One example of a suitable oleophobic coating is a fluorinated urethane polymer and is marketed as NRD-342 by DuPont. Most known treatment materials are polymer resins made by emulsion polymerization and are sold as aqueous dispersions. These polymers are typically used to treat fabrics as a treatment for carpets or as a dirt and stain resistance treatment. These treatments are typically used on fabric yarns, threads, filaments and fibers that are significantly larger in size than the nodes 22 and fibrils 24 of the membrane 16. These yarns, threads, filaments and fibers are generally made from material with a relatively high surface energy that allow aqueous dispersions to wet and ultimately treat the entire yarn, thread, filament or fiber. These yarns, threads, filaments and fibers also define significantly larger voids even in a tightly knit or woven fabric than the pores 26 in the membrane 16 so there is generally no problem with coating all surfaces with the particle solids suspended in the water based dispersion treatment material.

The preferred aqueous dispersion of treatment material contains relatively low molecular weight fluorinated urethane polymer particles or "solids". The dispersion also includes water and surfactant, such as sodium dodecyl benzene sulfonate to suspend the particles in the water and minimize the chance of the solids to form agglomerates. The polymer particles are preferably separated from the water and the surfactant prior to use according to the present invention. There could be solvents, co-solvents or other surfactants in the dispersion without detracting from the spirit and scope of the present invention. Other suitable treatment materials that include fluorinated urethane polymer particles are DuPont's Zonyl® C700 or TLF-9526. Another suitable treatment material is the Zonyl® family of fluorinated acrylic polymers (made by DuPont and available from CIBA Specialty Chemicals), such as Zonyl® 7040. These chemicals are also examples of stain resistant treatments typically used for carpets, textiles, fibers and fabrics but not microporous membranes.

Substantially improved oleophobic properties of the microporous membrane 16 are realized if the surfaces defining the pores 26 in the membrane and the major side surfaces of the membrane are treated or coated with any of the fluorinated polymers described above, and especially with the preferred oleophobic fluorinated urethane polymer treatment material. The limiting factor previously has been the lack of an effective way to introduce the polymer into the pores 26 of the membrane 16 to evenly coat the surfaces of the nodes 22 and fibrils 24 that define the pores. The present invention provides a way to introduce the polymer into even the smallest pores 26 of the membrane 16 to apply a relatively thin and even coating 28 to the surfaces of the nodes 22 and fibrils 24 that define the pores without having much of an impact on the size of the pores. Furthermore, the present invention provides a way to apply a coating 28 that may modify properties other than oleophobicity of the membrane 16, such as hydrophilicity, electrical conductivity, optical reflectivity, ion conductivity and color depending on the treatment material that is used.

Figure 6:
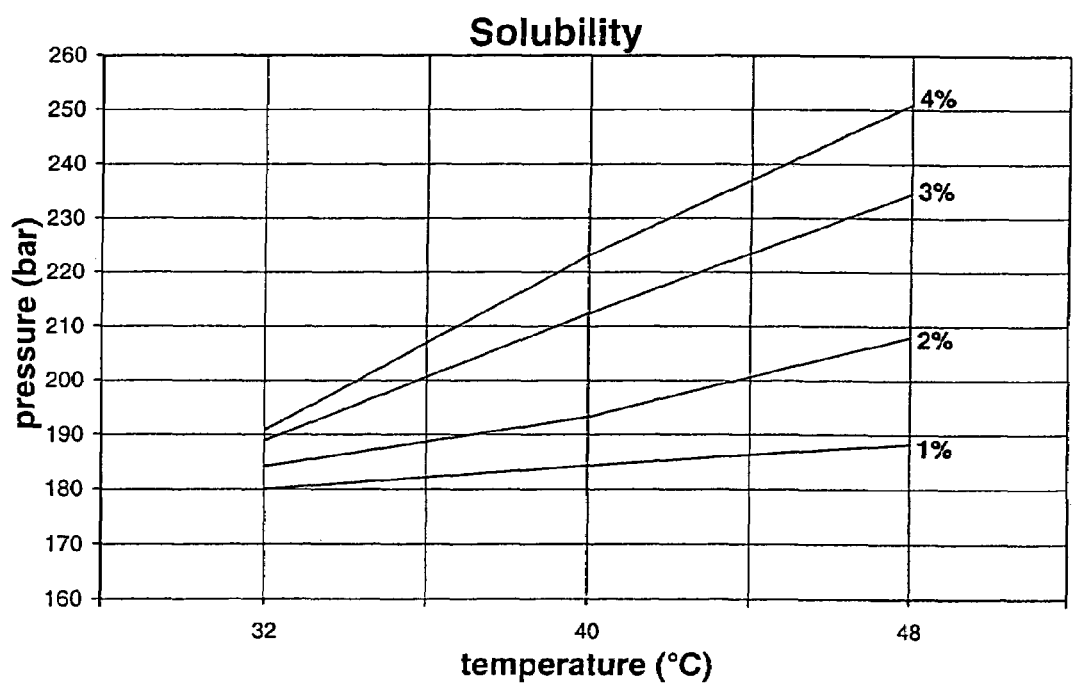
FIG. 6 is a graph of the solubility of a treatment material used in the present invention at various concentrations.

It has been found that a fluid under supercritical conditions can dissolve the preferred fluorinated urethane polymer particles. The solubility of the preferred treatment material in supercritical carbon dioxide is illustrated in FIG. 6 at various concentrations. The resulting solution is capable of wetting the membrane 16 and entering pores 26 in the microporous membrane 16 with the dissolved fluorinated urethane polymer. The solution with dissolved fluorinated urethane polymer has a surface tension, viscosity and relative contact angle that permit the dissolved treatment material to be easily carried into the smallest pores 26 of the membrane 16 with the solvent.

Figure 5:
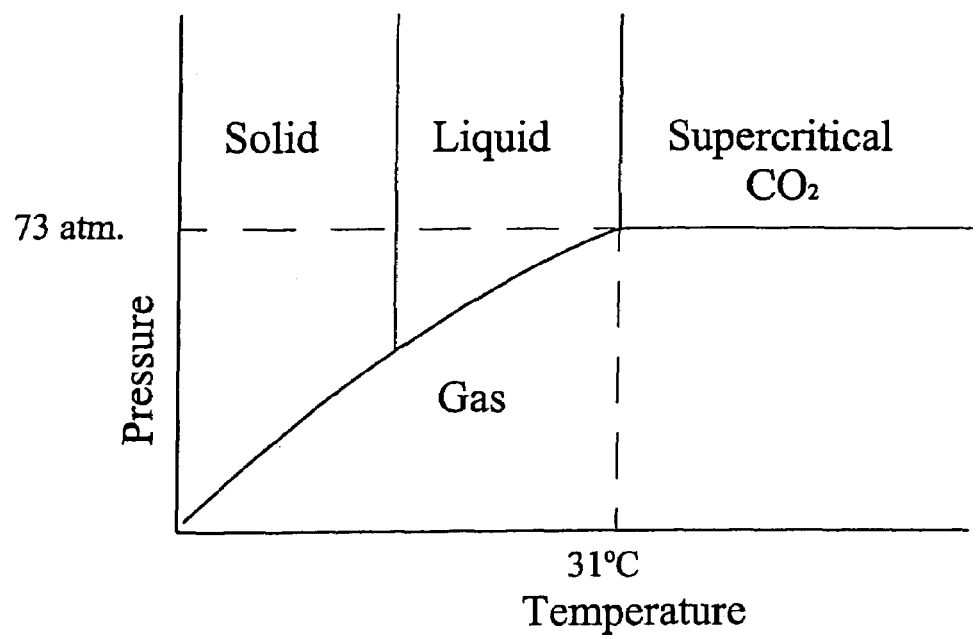
FIG. 5 is a graphical representation of various states of a fluid used in the treatment of the present invention.

The solvent is preferably carbon dioxide in a supercritical phase as illustrated in FIG. 5. The surface tension of the supercritical carbon dioxide (SCCO2) solution is less than 5.0 dynes/cm, preferably less than 1 dyne/cm and most preferably less than 0.1 dyne/cm so it can enter very small areas of the article to be treated. Supercritical carbon dioxide also has a viscosity of less than about 0.1 centipoise. The viscosity and surface tension of the solution are extremely low so very little resistance to flow is encountered, thus, lending itself to the possibility of entering even the smallest pores or areas, such as between portions of the PTFE molecules of the membrane 16. Thus, it is possible according to the present invention to enter and coat porous membrane material with a relatively small pore size that has been heretofore impossible.

Particularly attractive properties are provided by SCCO2 in that it behaves like a gas and a liquid at the same time. When it behaves like a liquid, it can dissolve material and act as a solvent as described above. The density of SCCO2 is about 0.9 grams/cc so it functions like a solvent. The carbon dioxide is not harmful to the environment since it is preferably obtained from sources that create it as a by-product and can be repeatedly recovered and re-used. When SCCO2 behaves like a gas it has very low viscosity and surface tension, so it can enter very small spaces, such as a relatively small pore in an ePTFE membrane 16 or spaces or voids in a PTFE node 22, fibril 24 or molecule forming the membrane.

The preferred oleophobic fluorinated urethane polymer particles are deposited onto the surfaces of the nodes 22 and fibrils 24 which define the pores 26 of microporous membrane 16 to form the coating 28 to reduce the surface energy of the composite membrane 12. The fluorinated urethane polymer coating 28 of the composite membrane 12 also serves to increase the contact angle for a challenge liquid relative to the composite membrane. Thus, relatively few challenge liquids are capable of wetting the composite membrane 12 and enter the pores 26.

The coating 28 of the present invention is disposed on and around surfaces of the nodes 22 and fibrils 24 that define the interconnecting pores 26 extending through the membrane 16. A small amount of the treatment material is also absorbed into the material of the membrane 16. Once a predetermined proper amount of fluorinated urethane polymer particles is deposited on the membrane 16, it was found that the pores 26 in the composite membrane 12 were not dramatically reduced in flow area from that of an uncoated membrane. This results in a relatively thin and even coating 28 being applied to the membrane 16.

After the ePTFE membrane 16 is manufactured, the oleophobic fluorinated urethane polymer is applied to the membrane in such a manner that it enters the pores 26 defined by the surfaces of the nodes 22 and fibrils 24. It is not necessary that the coating 28 completely encapsulate the entire surface of a node 22 or fibril 24 or is continuous to increase oleophobicity of the membrane 16, but it is preferred. The relatively thin coating 28 results from evenly depositing numerous small fluorinated urethane polymer particles on as much of the surface area of the membrane 16 as possible, including surfaces defining the pores 26.

The size of the precipitated particle is believed to be in the range of about 1.0 nanometer to about 10.0 nanometers in diameter and preferably in the 1.0 nanometer to 5.0 nanometers range. It is believed that the particle size that is precipitated depends on the rate of depressurization. Thus, the ratio of the deposited coating 28 thickness T2 to the fibril 22 size T1 is in the range of 0.2% to 20% and for the preferred particle size the range is 0.2% to 10%. The ratio of the deposited coating thickness T2 to the effective average size S of the pores 26 is in the range of 0.2% to 10% and for the preferred particle size the range is 0.2% to 5%.

Figure 7:
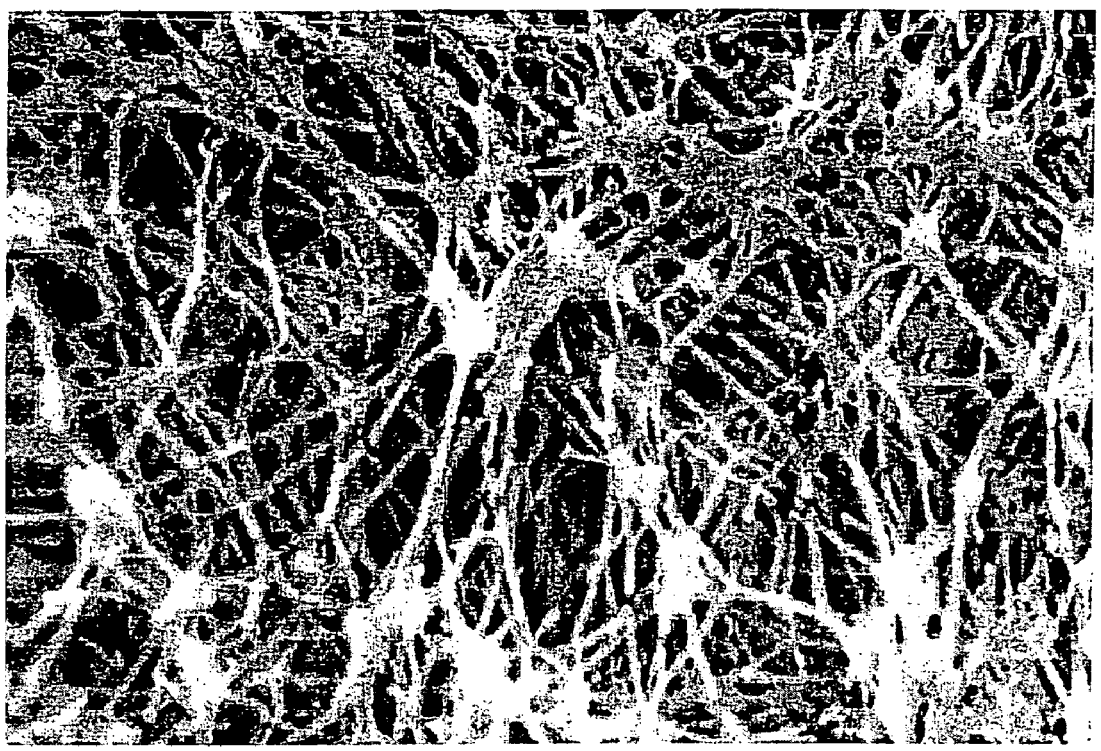
FIG. 7 is an SEM photomicrograph of a portion of the membrane treated according to the present invention.

The fluorinated urethane polymer particles engage and adhere to surfaces of the nodes 22 and fibrils 24 that define the pores 26 in the membrane 16 after the particles precipitate out of the solvent. The deposited fluorinated urethane polymer particles may be heated on the membrane 16 to flow and cover the surfaces of the nodes 22 and fibrils 24 and thereby render the composite membrane 12 even more resistant to contamination from absorbing oils and contaminating agents. During the application of heat, the thermal mobility of the fluorinated urethane polymer particles orients the —CF3 groups contained in the polymer on the nodes 22 and fibrils 24. The —CF3 groups of the preferred polymer orient to extend into the air to better repel challenge liquids. The fluorinated urethane polymer coating 28, thus, provides a relatively thin and maximized protective coating on the membrane 16 that does not completely block or "blind" the pores 26 in the composite membrane 12, as illustrated in FIG. 7, that could adversely affect moisture vapor transmission or air permeability through the composite membrane.

The composite membrane 12 of the present invention has a relatively high moisture vapor transmission rate (MVTR) and air permeability while its oleophobic properties are improved by the coating 28. The composite membrane 12 has an oil hold out of at least a number 6 and preferably is a number 8 as determined by AATCC 118 testing. In some cases, the oleophobicity can be further improved by heating the deposited material that forms the coating 28. The composite membrane 12 preferably has a moisture vapor transmission rate (MVTR) of at least 50,000 g/m2/day and more preferably at least 70,000 g/m2/day measured by JIS-1099B2 testing. The composite membrane 12 is air permeable to a sufficient degree that a user of apparel made from the composite membrane can be relatively comfortable in most conditions and even during periods of extreme physical activity. The composite membrane 12 preferably has an air-permeability of at least 0.20 CFM per square foot of membrane and more preferably at least 0.30 CFM per square foot of membrane measured by ASTM D737 testing.

The composite membrane 12 has at least a portion of the fluorinated urethane polymer treatment material forming the coating 28 absorbed into the material of the membrane 16. That is, portions such as molecules of the fluorinated urethane polymer treatment material enter small regions in the PTFE material of the membrane 16. The portions of the treatment material are engaged by at least two amorphous portions of the membrane 16 to mechanically capture and at least partially encapsulate some of the material of the coating. Thus, the treatment material of the coating 28 is more difficult to wash out or be removed by abrasion or flexing of the composite membrane 12. If some of the coating 28 is washed away or removed by damage or attrition, the coating is repaired by absorbed treatment material exuding from the PTFE.

The treatment material of the coating 28 is absorbed by spaced apart amorphous portions of PTFE of molecule when the PTFE membrane material swells as it is exposed to supercritical carbon dioxide. The PTFE material may swell up to about 30 percent of its initial size when exposed to supercritical carbon dioxide. The low viscosity and low surface tension solution carries the treatment material polymer into extremely small voids within of the PTFE material. When the carbon dioxide transitions to a condition outside its supercritical phase, the PTFE material is no longer swelled. Any portions or molecules of the fluorinated urethane polymer surrounded by the swelled portions of the PTFE can be mechanically engaged or trapped by the now unswelled PTFE material of the membrane 16. At least a portion of the absorbed fluorinated urethane polymer can exude from the membrane. This exuding process is a self-healing mechanism that maintains the oleophobic properties of the composite membrane 12 for a relatively long period of time by replacing missing or damaged portions of the coating 28. Exuding of the captured portions of the coating 28 inherently occurs over time but is accelerated when the composite membrane 12 is exposed to heat or ultraviolet light, such as sunlight. Heat and sunlight provide energy to vibrate the PTFE material. The vibration allows the absorbed material to overcome the attractive force holding it in the PTFE material and move or exude from its original location inside the PTFE material to the outer surface.

The solution or even supercritical carbon dioxide on its own can also be used to break the crystalline bonds between portions of the PTFE molecule of the membrane 16. Thus, sintering can be performed without heat. This is accomplished by adjacent crystalline portions of the PTFE material being forced apart due to swelling when exposed to supercritical carbon dioxide. The distance separating these swelled adjacent portions of the PTFE molecule exceeds the distance required by Van der Waals forces to maintain molecular crystallinity. Thus, this separation becomes permanent and a more amorphous ePTFE membrane results.

System Equipment

Equipment 60 for use in the method of treating the membrane 16 according to the present invention is schematically illustrated in FIG. 1. Lab scale equipment, based on the equipment 60, was used in most of the examples described below. The equipment 60 includes a treatment vessel 62 for treating the membrane 16. The treatment vessel 62 is preferably in the form of an autoclave capable of withstanding pressure up to 10,000 psi (about 690 bar) and elevated temperature in the range of 100° C. to 300° C. (212° F. to 572° F.). The treatment vessel 62 is sized appropriately to treat the desired width and length of membrane 16. The treatment vessel 62 is fluidly connected to a supply and circulation pump 64 by line 66. The treatment vessel 62 has an external heater 68 to maintain the walls of the treatment vessel at a predetermined temperature. The treatment vessel 62 is located in a fluid circulation loop connected by line 82 to a temperature control device 84, optional static mixer 86 and treatment introduction vessel 88. The treatment introduction vessel 88 is connected to pump 64 through line 102 and valve 104. Valve 104 and valve 106 allow flow through line 108 to bypass the treatment introduction vessel 88. The temperature control device 84 may provide cooling or heating to the line 82 and the fluid contained in the line. Any or all of the lines and vessels may be heated or cooled to compensate for cooling when the CO2 expands or heating when the CO2 is compressed.

Pump 64 is also connected to a solvent storage container 122 through line 124 and valve 126. The storage container 122 houses liquid solvent under pressure and is maintained at a temperature to assure delivery of solvent in a liquid phase to pump 64. The treatment vessel 62 is also connected to separation and recovery station 142 through line 144 and valve 146. The separation and recovery station 142 is vented to atmosphere or may be optionally connected to the storage container 122 for reusing recovered CO2.

Figure 2:
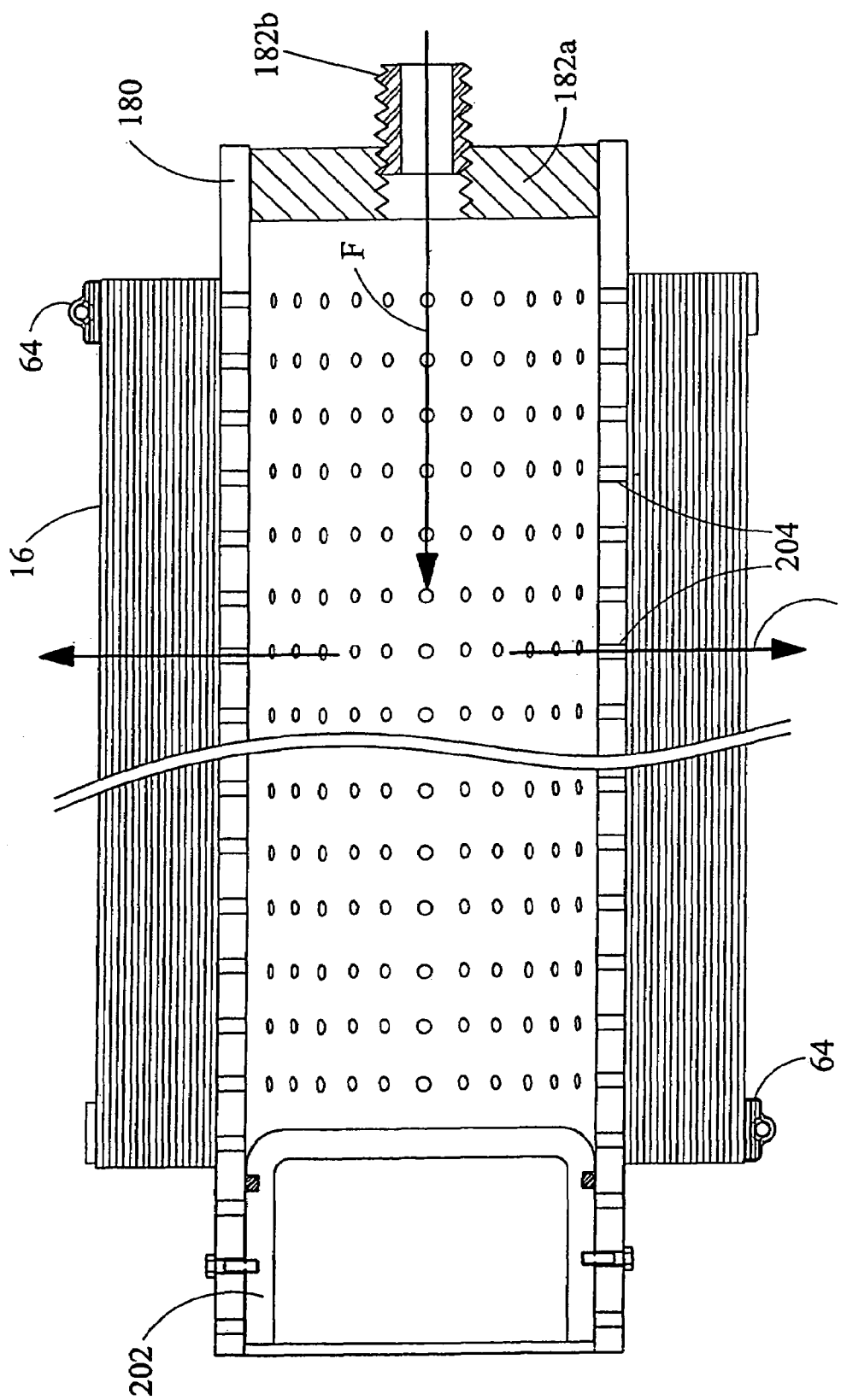
FIG. 2 is an enlarged sectional view of a portion of the equipment illustrated in FIG. 1.

The untreated membrane 16 is rolled onto a core 180, as illustrated in FIG. 2, and the ends of the roll secured with securement mechanisms 64 such as clamps to hold the membrane on the core and prevent fluid flow axially out the ends of the roll. The securement mechanisms 64 are preferably radially and circumferentially contractible. The securement mechanisms 64 are sufficiently tightened so no fluid flows in a direction axially out the ends of the roll of membrane 16 between radially adjacent wraps but radially through the pores 62 in every wrap of the roll of membrane as indicated by arrows F. The core 180 is made from any suitable material, such as perforated stainless steel and includes a multiplicity of openings 204 extending radially through the core. The core 180 and membrane 16 are supported in the treatment vessel 62 so the membrane 16 does not contact the interior of the treatment vessel 62 and fluid flow can occur around the entire roll of membrane.

While any suitable connection, support and cap structure may be used, the core 180 is sealed at one axial end to a core cap 182a that is welded to the core. The core cap 182a is attached to a removably securable end cap 184 of the treatment vessel 62 by a threaded connection 182b. The core 180 is shown extending horizontally. It will be apparent that the core 180 and treatment vessel 62 could be oriented in a vertical direction or any other orientation. The interior of the core cap 182a, threaded connection 182b and core 180 are in fluid communication with line 82 through a port in the end cap 184.

The other axial end of the core 180 has a second removably securable core cap 202 that prevents fluid flow out that end of the core. The numerous openings 204 in the core 180 direct fluid to flow radially from the inside the core, through the pores 26 in all the layers in the roll of membrane 16 and into a space 206 (FIG. 1) between the exterior of the roll of membrane and the interior wall 208 of the treatment vessel 62 as indicated by arrows F (FIG. 2). In operation, a pressure differential of about 30 psi was observed between the inside of the core 180 and the outside of the roll of membrane 16. It will be apparent that the pressure differential may vary and is a function of fluid flow velocity, roll size, pore size and pore density. Fluid flows from the space 206 (FIG. 1) in the treatment vessel 62 through an opening in a second removably securable end cap 212 of the treatment vessel 62 through a port and to line 66.

Process

The treatment material may require separation of the polymer particle solids from the dispersion that it is available in. Particle solids of the preferred fluorinated urethane polymer treatment material are placed in the treatment introduction vessel 88. The amount of treatment material depends on the solution concentration desired in the system. The core 180 and roll of membrane 16 are placed in the treatment vessel 62 and connected by the threaded connection 182b to end cap 184 for fluid flow through the core and roll. End caps 184 and 212 are secured to seal the treatment vessel 62. The membrane 16 is made from a material that does not dissolve in the selected fluid solvent. Vacuum is applied to the system and maintained for sufficient time to remove generally undesired substances like water and air.

Valve 146 is closed and valve 126 is positioned to allow fluid flow to the system. Liquid solvent, such as the preferred carbon dioxide, flows from the storage container 122 into the treatment vessel 62 and the rest of the system at the storage pressure. Valves 104 and 106 are initially positioned to bypass vessel 88 and create a closed circulation loop between the treatment vessel 62 and pump 64. Pump 64 is started to fill all lines 102, 108, 82 and 66, vessel 62 and mixer 86 and increase pressure. Valve 126 is positioned to block flow from container 122 and permit flow between the pump 64 and treatment vessel 62. Pump 64 raises the pressure in the system to a predetermined pressure. Valves 104 and 106 are positioned to close off bypass line 108. Fluid flows from the pump 64, through line 102, treatment introduction vessel 88, static mixer 86, line 82 and to treatment vessel 62.

System pressure increases to a desired predetermined pressure. The temperature and pressure of the solvent is controlled as determined by the solubility of the treatment material to be in a phase or condition so the treatment material may dissolve, as illustrated in FIG. 6, for a desired solute concentration. Pressure and volume of solvent may be increased in a known manner by a make-up supply and pump (not shown).

It has been found that particularly suitable treatment materials are NRD-342 and Zonyl® C700. The treatment material is exposed to the fluid when the fluid is in a phase that can solubilize the treatment material. One such fluid solvent is carbon dioxide in a supercritical phase (FIG. 5). For example, when supercritical carbon dioxide (SCCO2) is at 220 bar or higher pressure and a temperature of 35° C., as illustrated in FIG. 6 for the concentration of up to 4%, the preferred treatment material NRD-342 particles dissolve in the solvent. Each concentration line in FIG. 6 represents a "cloud point" where the solute visually becomes insoluble and begins to precipitate out of the supercritical fluid during a phase monitor study as a function of pressure. The treatment material solid particles in the treatment introduction vessel 88 dissolve in the solvent flowing through it at supercritical conditions.

Other treatment materials can be used and have their own solubility parameters that can be determined in phase monitor studies. It will be apparent that any suitable fluid capable of becoming supercritical can be used and the use of a co-solvent such as methyl isobutyl ketone (MIBK) may be desired. Flow through the vessel 88 continues until the desired concentration of the treatment material solute in the solvent is attained. It will also be apparent that the treatment material can be in liquid form and pumped into the system. It may be desirable to equalize pressure between the interior of the core 180 and the exterior 206 of the roll by apparatus not shown until certain system conditions, such as concentration, or pressure and/or temperature are reached. This flow path is maintained until the desired amount of solids in the treatment introduction vessel 88 is dissolved to obtain a desired predetermined concentration of treatment material in the solution.

Once the desired system conditions are reached, the treatment material solute and solvent in the solution are circulated through the system for an appropriate predetermined time. The flow path may be any suitable flow path. By way of example, the solution is routed through the pump 64, treatment introduction vessel 88 (or bypassed through line 108), static mixer 86, temperature control device 84, line 82, through end cap 184, into the interior of the core 180, through the pores 26 in the roll of membrane 16, into the space 206 in the treatment vessel 62, through the cap 212, through line 66 and then back to pump 64. This assures that every pore 26 in the roll of membrane 16 has been exposed to the treatment material. For the NRD-342 and Zonyl® C700 treatment materials, a solution concentration in the range of 1 weight percent to 5 weight percent in the supercritical carbon dioxide solvent was used and found to be suitable.

After the desired concentration of treatment chemical is obtained in the solution, the solution is circulated in the closed loop system for a predetermined time to assure that every pore 26 in every layer of the roll of the membrane 16 has the treatment material at the desired concentration of treatment material flowing through it. The solution of the treatment material is circulated through the treatment vessel by entering the cap 184 at a central location. The end cap 184 has the core 180 attached by connection 182b (FIG. 2). The solution of treatment material flows through the core 180, through all the pores 26 in the roll of membrane 16 and into the space 206 between the roll of membrane and the interior wall 208 of the treatment vessel 62. The solution of the treatment material then flows through a port in the end cap 212 and into line 66. When the solution circulates for sufficient time at the desired conditions, the pump 64 is stopped. Enough time is allowed to lapse to assure that the fluid has stopped moving in the system and particularly in the pores 26 in the membrane 16 due to its momentum to minimize the chance that treatment material can be carried away from the pores with flow.

The pressure and/or temperature of the solution are/is then permitted to change to a condition in which the treatment material solute is no longer soluble, as illustrated in FIG. 6. For example, the pressure is reduced to 150 bar and the temperature is maintained at 35° C. The pressure can then be further reduced to atmospheric so the treatment vessel 62 can be opened. If the treatment material is soluble in liquid carbon dioxide, the temperature and pressure are controlled to keep the carbon dioxide in the gaseous state during emptying of the treatment vessel 62.

Figure 4:
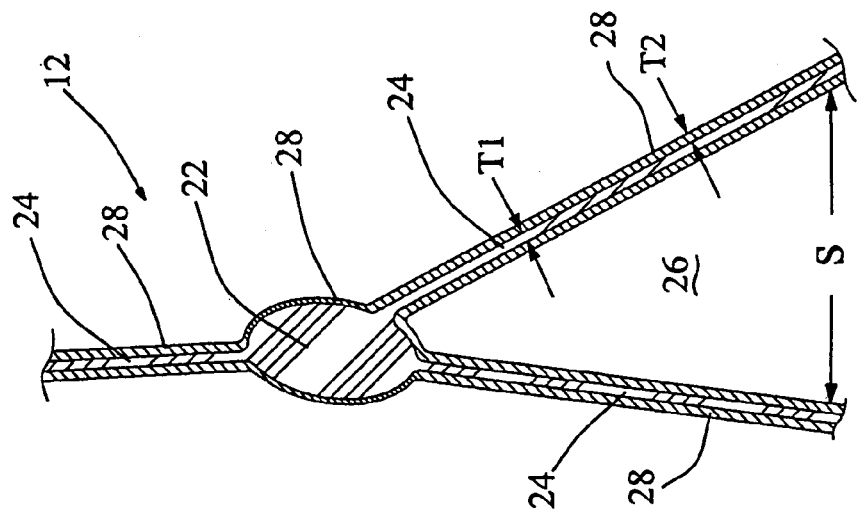
FIG. 4 is an enlarged sectional view of a portion of the membrane in FIG. 3 illustrating a coating on the membrane.
Figure 3:
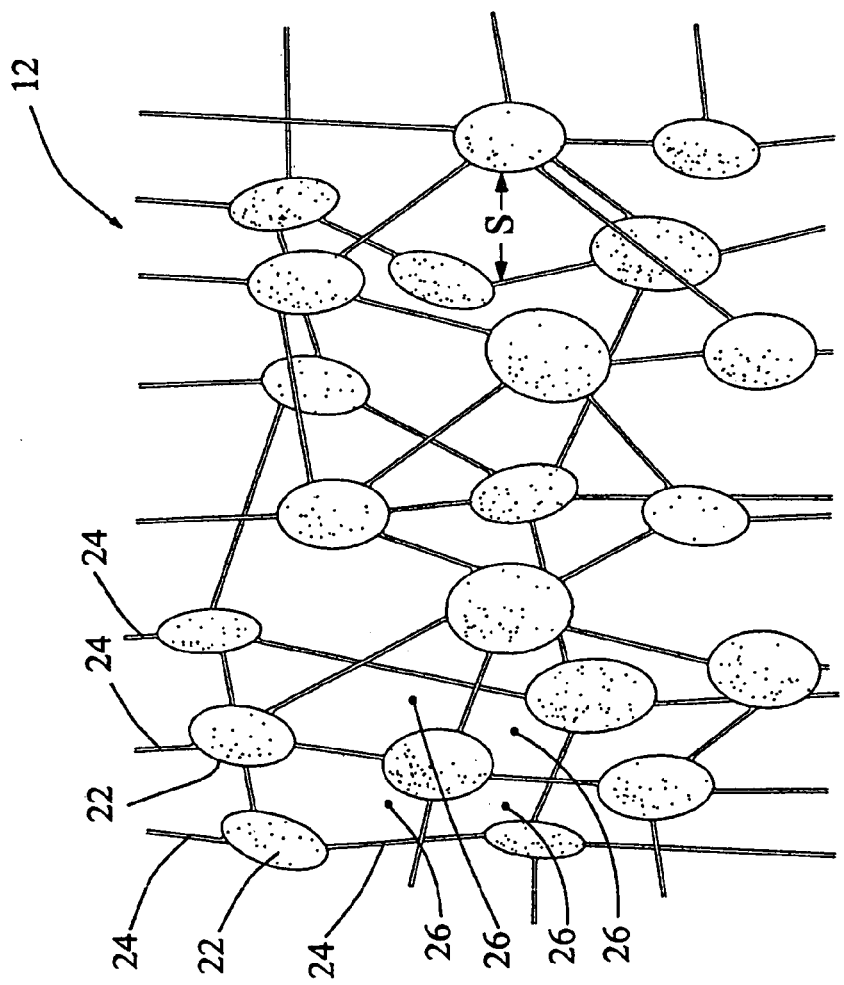
FIG. 3 is an enlarged schematic illustration of a portion of a membrane treated according to the present invention.

The treatment material precipitates out of the solution when it first becomes insoluble. The precipitated treatment material deposits onto the surfaces of the nodes 22 and fibrils 24 defining the pores in the porous membrane 16 to form the coating 28 (FIGS. 3 and 4). The coating 28 of treatment material is extremely thin and evenly distributed on the surface defining the pores 26 of the membrane 16. The deposited treatment material coating 28 does not block the pores 26 of the membrane 16 so air permeability of the membrane is not adversely affected. The particle size of the deposited treatment material is about 1-5 nanometers. The size of the particle precipitated can be increased by depressurizing slower. The deposited treatment material covers all or at least substantially all of the surface area of the membrane 16.

At least a portion of the fluorinated urethane polymer is absorbed into amorphous portions of the membrane 16. This occurs because amorphous portions of the PTFE membrane material swell as much as 30 percent from their initial unswelled size. When the supercritical carbon dioxide solvent changes from its supercritical phase to subcritical, the PTFE material returns to its initial size and portions of the deposited polymer treatment material are mechanically encapsulated or "captured" by the PTFE material of the membrane 16. At least a portion of the absorbed fluorinated urethane polymer may exude from the membrane with time and is accelerated by exposure to heat or to sunlight.

The membrane modifying method may include exposing the ePTFE membrane to just carbon dioxide (CO2) at supercritical conditions to swell a portion of the ePTFE membrane from an initial size to a swelled size. That is, no treatment material is used. The crystalline bonds in the swelled portion of the ePTFE membrane are broken to render the swelled portion more amorphous. The ePTFE membrane is removed from exposure of the carbon dioxide (CO2) at supercritical conditions. The portion of the ePTFE membrane returns towards the initial size while retaining the amorphous condition in that portion of the ePTFE membrane. DSC results confirm that there was an increase in amorphous content.

Post-Treatment Heat

Heat may optionally be applied to the composite membrane 12 with the precipitated coating 28 applied. Heat may be applied at about 140° C. heat for about thirty (30) seconds to the composite membrane 12. The applied heat permits the coating 28, such as the fluorinated urethane polymer solids precipitated onto the membrane 16, to further flow around the surfaces of the nodes 22 and fibrils 24 to become even more uniformly distributed and thinner to render the composite membrane 12 oil and contaminating agent resistant to a more significant degree than a composite membrane that has not been heated. The heat that is applied to the composite membrane 12 accelerates the fluorine portions (not shown) orienting to extend in a direction away from the surfaces of the nodes 22 and fibrils 24 that are coated.

EXAMPLE 1

Approximately 60 yards of ePTFE membrane 16 (QM011SP available from BHA Technologies, Inc. in Kansas City, Mo.) was wound onto a three inch outside diameter perforated core 180 in about 200 wraps. The roll of membrane 16 had an outside diameter of about 3.95 inches and a distance between the clamps of 22.3 inches. The average effective pore size of the membrane 16 was about 0.4 micron. 600 ml of TLF-9526 treatment material was placed in the treatment introduction vessel 88. A syringe pump was connected to the treatment introduction vessel 88 and one of the circulation lines in the system. The treatment material was introduced into a system volume of about 13 liters of supercritical CO2 flowing at a rate of about 1500 grams/minute at 300 bar and 40° C. by the pump 64. The treatment material solution was circulated in the system and flowed through the core 180 and membrane 16. The treatment material solution was circulated for one hour and the system was depressurized slowly. The membrane 12 removed from the treatment vessel 62 and core 180. The treated membrane 12 was tested. The results are reported in the table below.

| roll location | oil hold out | | air permeability | | MVTR | |
|---|---|---|---|---|---|---|
| | side 1 | side 2 | side 1 | side 2 | side 1 | side 2 |
| end 1 | 6 | 6 | 0.30 | 0.25 | 86000 | 85000 |
| middle | 6 | 6 | 0.25 | 0.34 | 83000 | 86000 |
| end 2 | 7 | 6 | 0.39 | 0.32 | 86000 | 86000 |

EXAMPLE 2

Approximately 70 yards of ePTFE membrane 16 (QM011 available from BHA Technologies, Inc. in Kansas City, Mo.) was wound onto the perforated core 180. The average effective pore size of the membrane 16 was about 0.5 micron. 284 grams of TLF-9526 solids treatment material was placed in a treatment introduction vessel 88 with frits on each end. The treatment material solids were dissolved by about 13 liters of supercritical CO2 flowing through the vessel 88. The treatment material solution was circulated in the system and flowed through the core 180 and membrane 16 in both directions for forty-five minutes. The system was then depressurized quickly. The membrane 12 removed from the treatment vessel 62 and core 180. The treated membrane 12 was tested. The results are reported in the table below.

| roll location | oil hold out | | air permeability | | MVTR | |
|---|---|---|---|---|---|---|
| | side 1 | side 2 | side 1 | side 2 | side 1 | side 2 |
| end 1 | 8 | 8 | 0.39 | 0.39 | 81000 | 69000 |
| middle | 7 | 7 | 0.38 | 0.37 | 79000 | 66000 |
| end 2 | 8 | 8 | 0.36 | 0.38 | 73000 | 69000 |

EXAMPLE 3

Several trials were performed by exposing the membrane 16 only to CO2 at supercritical conditions. This was to determine the effects of exposure to SCCO2. One trial was performed by exposing the membrane 16 to SCCO2 at 280° C. at 4000 psi for 60 minutes. The membrane 12 showed only a slight decrease in Joules/gram by DSC analysis. A control sample of the membrane had 62.57 J/gram before exposure to SCCO2 and a membrane sample after exposure to SCCO2 measured 60.45 Joules/gram. Another trial was conducted by exposing a membrane 16 to SCCO2 at 327° C. at 4000 psi for 60 minutes. The pressure reduction was done at a rate of 5 psi/minute from 4000 psi to 1000 psi, and then from a 1000 psi to atmospheric pressure over a 60 minute period. A control sample of this second membrane had 47.63 J/gram before exposure to SCCO2 and the second membrane 12 sample after exposure to SCCO2 measured 27.23 J/gram. Yet another trial was conducted by exposing a membrane 16 to SCCO2 at 330° C. and 4000 psi for 60 minutes. A control sample of this third membrane sample had 57.06 J/gram before exposure to SCCO2 and the third membrane 12 sample after exposure to SCCO2 measured 30.86 J/gram.

EXAMPLE 4

Approximately 130 yards of ePTFE membrane 16 was wound onto the perforated core 180. The average effective pore size of the membrane 16 was about 0.5 micron. 400 grams of TBCU-A solids treatment material was placed in the treatment introduction vessel 88 with frits on each end. The treatment material was dissolved by about 13 liters of supercritical CO2 flowing through the treatment introduction vessel 88. The treatment material solution was circulated in the system at a rate of about 1600 grams/minute at 225 bar at an average temperature of 40° C. The treatment material solution flowed through the core 180 and membrane 16 from outside the roll and core to inside the core for thirty minutes and from inside the core to outside the core and roll for thirty minutes. The system was then depressurized in a controlled manner to keep the CO2 in a gaseous state until pressure reached 800 PSI. Fast depressurization was then permitted. The membrane 12 removed from the treatment vessel 62 and core 180. The treated membrane 12 was tested. The results are reported in the table below.

| roll location | oil hold out | | air permeability | | MVTR | |
| --- | --- | --- | --- | --- | --- | --- |
| | side 1 | side 2 | side 1 | side 2 | side 1 | side 2 |
| end 1 | 6 | 6 | 0.38 | 0.31 | 74000 | 89000 |
| middle | 6 | 6 | 0.32 | 0.28 | 84000 | 82000 |
| end 2 | 6 | 6 | 0.30 | 0.24 | 84000 | 69000 |

EXAMPLE 5

Approximately 130 yards of ePTFE membrane 16 was wound onto the perforated core 180. The average effective pore size of the membrane 16 was about 0.5 micron. 488 grams of NRD-342 solids treatment material was placed in the vessel 88 with frits on each end. The treatment material was dissolved by about 13 liters of supercritical CO2 flowing through the system at a rate of about 1600 grams/minute at 280 bar and an average temperature of 37° C. The treatment material solution was circulated in the system and flowed through the core 180 and membrane 16 from the inside to the outside of the roll of membrane for thirty-four minutes. The system was then depressurized in a controlled manner to keep the CO2 in a gaseous state until pressure reached 800 PSI. Fast depressurization of the treatment vessel was then permitted. The membrane 12 removed from the treatment vessel 62 and core 180. The treated membrane 12 was tested. The results are reported in the table below.

| roll location | oil hold out | | air permeability | | MVTR | |
| --- | --- | --- | --- | --- | --- | --- |
| | side 1 | side 2 | side 1 | side 2 | side 1 | side 2 |
| end 1 | 8 | 8 | 0.32 | 0.31 | 90000 | 84000 |
| middle | 8 | 8 | 0.27 | 0.28 | 77000 | 86000 |
| end 2 | 8 | 8 | 0.24 | 0.24 | 79000 | 72000 |

EXAMPLE 6

Vacuum was applied to the system initially. Approximately 130 yards of ePTFE membrane 16 was wound onto the perforated core 180. The average effective pore size of the membrane 16 was about 0.229 micron. 400 grams of NRD-342 solids treatment material was placed in the vessel 88 with frits on each end. The treatment material was dissolved by about 13 liters of supercritical CO2 flowing through the system at a rate of about 1600 grams/minute at 280 bar and an average temperature of 36° C. The treatment material solution was circulated in the system and flowed through the core 180 and membrane 16 from the inside to the outside of the roll of membrane for thirty-four minutes. The system was then depressurized in a controlled manner to keep the CO2 in a gaseous state until pressure reached 800 PSI. Fast depressurization of the treatment vessel 62 was then permitted. The membrane 12 removed from the treatment vessel 62 and core 180. The treated membrane 12 was tested. The results are reported in the table below.

| roll location | oil hold out | | air permeability | | MVTR | |
| --- | --- | --- | --- | --- | --- | --- |
| | side 1 | side 2 | side 1 | side 2 | side 1 | side 2 |
| end 1 | 8 | 8 | 0.23 | 0.21 | 76000 | 67000 |
| middle | 8 | 8 | 0.22 | 0.20 | 62000 | 49000 |
| end 2 | 8 | 8 | 0.21 | 0.18 | 66000 | 68000 |

EXAMPLE 7

To determine if the fluorinated urethane polymer was captured by the ePTFE membrane by the following procedure. A sample (approximately 5"×5") of membrane 12 that initially showed a number 8 oil holdout from Example 5 above was selected. This sample was soaked in methyl isobutyl ketone (MIBK) for a few minutes. The sample was removed from the MIBK and the surface was wiped with a paper towel. The sample was soaked in about fresh MIBK. The sample was removed from the MIBK and the surface was wiped with a paper towel. This procedure should ensure that all the fluorinated urethane polymer is removed from all the surfaces of the membrane 12. The sample was air dried overnight and the oil holdout measured at a number 4 by the AATCC 118 test. The sample was then exposed to sunlight for two days and the oil holdout measured at a number 5. After heating the sample, the oil holdout remained at a number 5.

Because untreated ePTFE membrane 16 has an oil holdout number of 1, an oil hold of at least a number 2 suggests that the fluorinated urethane polymer was mechanically captured by the ePTFE membrane during the treatment process of the present invention. The increase in oil holdout after exposure to sunlight suggests that the fluorinated urethane polymer does exude.

EXAMPLE 8

A wash durability test was conducted to further determine if the fluorinated urethane polymer was captured by the ePTFE membrane 12. A sample of membrane 12 that initially showed a number 8 oil holdout from Example 5 above was selected. The sample was sewn into a protective shell. Wash water temperature was 80° F. without soap. The samples were dried at 150° F. before each oil holdout test. The results of the test are shown below and suggest that the fluorinated urethane polymer is durable on the membrane 12.

| Wash hours | Oil holdout |
| --- | --- |
| 0 | 8 |
| 15 | 8 |
| 25 | 8 |
| 35 | 8 |
| 50 | 8 |

EXAMPLE 9

Approximately 249 yards of ePTFE membrane 16 was wound onto the perforated core 180. The average effective pore size of the membrane 16 was about 0.5 micron. The roll of membrane 16 had an outside diameter of about 6.4 inches and a distance between the clamps of about 65 inches. 4005 grams of NRD-342 dried solids treatment material was placed in the treatment introduction vessel 88 between frits. The treatment material was dissolved by about 105,000 grams of supercritical CO2 flowing through the treatment introduction vessel 88. The treatment material solution was circulated in a relatively larger scale system than previous treatment examples at a rate of about 2700 grams/minute at 260 bar at an average temperature of 32° C. The treatment solution flowed through the core 180 and membrane 16 from inside the core to outside the core and roll for ninety minutes. The system was then depressurized in a controlled manner to keep the CO2 in a gaseous state. The membrane 12 removed from the treatment vessel 62 and core 180. The treated membrane 12 was tested. The results are reported in the table below.

| roll location | oil hold out | | air permeability | | MVTR | |
|---|---|---|---|---|---|---|
| | side 1 | side 2 | side 1 | side 2 | side 1 | side 2 |
| end 1 | 8 | 8 | 0.35 | 0.35 | 85000 | 89000 |
| middle | 8 | 8 | 0.35 | 0.38 | 89000 | 88000 |
| end 2 | 8 | 8 | 0.32 | 0.28 | 92000 | 73000 |

From the above description of preferred embodiments of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A method for modifying at least one property of an at least partially sintered expanded polytetrafluoroethylene (ePTFE) porous membrane, said method comprising the steps of:
    providing an at least partially sintered expanded polytetrafluoroethylene (ePTFE) membrane having interconnecting pores extending through the membrane of an average pore size no greater than 10 micron;
    exposing the membrane to a fluid at supercritical conditions;
    modifying at least one property of the membrane while the membrane is exposed to the fluid at supercritical conditions by depositing a modifier onto surfaces defining the pores in the membrane; and wherein said modifying step comprises
    moving a portion of the modifier into a swelled portion of the membrane material; and
    changing the condition of the fluid in such a manner that the membrane retains the modified property by the deposited modifier remaining on the surfaces defining the pores; and
    permitting said membrane to return towards its original size and configuration to absorb a portion of said modifier, wherein a portion of said absorbed modifier thereafter exudes from said membrane.

2. The method of claim 1 wherein said exposing step includes the step of providing carbon dioxide (CO2) as the fluid.

3. The method of claim 1 wherein the property of the membrane that is modified is selected from the group comprising the amount of amorphous content, oleophobicity, hydrophilicity, electrical conductivity, optical reflectivity, ion conductivity, porosity and color.

4. The method of claim 1 wherein said step of modifying further includes the steps of:
    providing treatment material that is soluble in the fluid at the supercritical conditions as said modifier;
    dissolving the treatment material in the fluid at supercritical conditions;
    exposing the membrane to the dissolved treatment material in the supercritical fluid for a predetermined amount of time at a predetermined temperature and pressure; and
    causing the treatment material to precipitate onto the surfaces defining the pores in the membrane to effect the modification of the property of the membrane.

5. The method of claim 4 wherein the treatment material is selected from the group comprising a fluorinated urethane polymer and a fluorinated acrylic polymer.

6. The method of claim 4 further including the step of causing the precipitated treatment material to flow by applying heat to the precipitated treatment material along surfaces of the pores of the membrane.

7. The method of claim 1 wherein said step of modifying further includes the steps of:
    exposing the ePTFE membrane to carbon dioxide ($CO_2$) at supercritical conditions to swell a portion of the PTFE material from an initial size to a swelled size;
    breaking crystalline bonds in the swelled portion of the PTFE material to render the swelled portion more amorphous; and
    removing the PTFE material from exposure to the carbon dioxide ($CO_2$) at supercritical conditions so the portion of the PTFE material returns towards the initial size while retaining the amorphous condition in that portion of the PTFE material.

8. The method of claim 1 wherein said providing step includes providing an open pore membrane.

9. The method of claim 1 wherein said exposing step includes flowing the fluid through more than one layer of membrane.

10. The method of claim 9 wherein said providing step includes the step of providing the membrane in a plurality of layers wrapped on a perforated core.

11. The method of claim 1 wherein the fluid has a surface tension of less than 5.0 dynes/cm.

12. A method for modifying at least one property of an at least partially sintered expanded polytetrafluoroethylene (ePTFE) membrane wherein the property is selected from the group of oleophobicity, hydrophilicity, electrical conductivity, ion conductivity and color, said method comprising the steps of:
    providing an at least partially sintered ePTFE membrane having interconnecting pores extending through the membrane;
    providing a treatment material;
    dissolving the treatment material in a fluid at supercritical conditions;
    exposing the ePTFE membrane to the dissolved treatment material and fluid at supercritical conditions for a predetermined amount of time at a predetermined temperature and pressure and causing said ePTFE membrane to swell;
    moving a portion of said treatment material into said swelled ePTFE membrane material;

causing at least one property of the ePTFE membrane to be modified while the membrane is exposed to the dissolved treatment material and supercritical fluid;

changing the condition of the fluid to cause the treatment material precipitate onto surfaces of the ePTFE membrane defining the pores in the ePTFE membrane and thereby effect the modification of the property of the ePTFE membrane; and permitting said ePTFE membrane to return to its original size and configuration during said changing step to absorb a portion of said treatment material; wherein a portion of the treatment material absorbed into the ePTFE membrane thereafter exudes from said ePTFE membrane.

13. The method of claim 12 wherein said dissolving step includes the fluid being carbon dioxide ($CO_2$).

14. The method of claim 12 wherein said exposing step includes flowing the dissolved treatment material and fluid at supercritical conditions through more than one layer of membrane.

15. The method of claim 14 wherein said providing step includes the step of providing the membrane in a plurality of layers wrapped on a perforated core.

16. The method of claim 12 wherein the fluid has a surface tension of less than 5.0 dynes/cm.

17. A method for treating an at least partially sintered expanded polytetrafluoroethylene (ePTFE) membrane having an amorphous portion and a crystalline portion, said method comprising the steps of:

providing an at least partially sintered microporous ePTFE membrane having surfaces defining pores;

exposing the ePTFE membrane to a coating treatment material in a fluid under supercritical conditions to swell a portion of the ePTFE membrane from an initial size;

breaking bonds in the crystalline portion of the ePTFE membrane by the swelling to render the swelled portion more amorphous; and removing the fluid at supercritical conditions from the ePTFE membrane so the swelled portion of the ePTFE membrane returns towards the initial size and the crystalline bonds remain broken in that portion of the ePTFE membrane; and causing said treatment material to precipitate onto the surfaces defining said pores of said membrane; and causing said ePTFE membrane material to absorb a portion of said treatment material.

18. The method of claim 17 wherein the fluid is carbon dioxide.

19. The method of claim 17 wherein said exposing step includes flowing the fluid through more than one layer of the ePTFE membrane.

20. The method of claim 19 wherein said providing step includes the step of providing the ePTFE membrane in a plurality of layers wrapped on a perforated core.

21. The method of claim 17 wherein the fluid has a surface tension of less than 5.0 dynes/cm.

22. A method for modifying at least one property of an at least partially sintered expanded polytetrafluoroethylene (ePTFE) porous membrane, said method comprising the steps of:

providing an at least partially sintered expanded polytetrafluoroethylene (ePTFE) membrane having interconnecting pores of an average pore size no greater than 10 micron extending through the membrane;

providing a treatment material;

dissolving the treatment material in a fluid having a surface tension less than 5.0 dynes/cm;

modifying at least one property of the membrane while the membrane is exposed to the dissolved treatment material and fluid; and wherein said modifying step comprises moving portion of the treatment material into a swelled portion of the membrane material; and changing the condition of the fluid in such a manner that the membrane retains the modified property; and permitting said membrane to return towards its original size and configuration to absorb a portion of said treatment material, wherein a portion of said absorbed treatment material thereafter exudes from said membrane.

23. The method of claim 22 wherein said dissolving step includes the step of dissolving the treatment material in a fluid under supercritical conditions.

24. The method of claim 22 wherein said dissolving step includes the step of dissolving the treatment material in a fluid having a surface tension less than 1 dyne/cm.

25. The method of claim 22 wherein said exposing step includes the step of providing carbon dioxide as the fluid.

26. The method of claim 22 wherein said modifying step includes the property of the membrane that is modified being selected from the group comprising the amount of amorphous content, oleophobicity, hydrophilicity, electrical conductivity, optical reflectivity, ion conductivity and color.

27. The method of claim 22 wherein said providing step includes the step of providing the porous membrane in a plurality of layers wrapped on a perforated core.

28. The method of claim 22 wherein said exposing step includes flowing the fluid through more than one layer of membrane.

* * * * *